United States Patent [19]

Gregory

[11] Patent Number: 5,078,363
[45] Date of Patent: Jan. 7, 1992

[54] VALVE ASSEMBLY FOR A TANK

[75] Inventor: David Gregory, Smithfield, Australia

[73] Assignee: Liquid Sales Pty. Ltd., Australia

[21] Appl. No.: 400,989

[22] Filed: Aug. 31, 1989

[30] Foreign Application Priority Data

Sep. 1, 1988 [AU] Australia .................. PJ0187

[51] Int. Cl.⁵ .......................... F16K 1/24; F16K 1/18; F16K 31/26
[52] U.S. Cl. .................................... 251/58; 251/61.4; 251/144; 251/215; 251/228; 251/339
[58] Field of Search ............... 137/527, 527.4; 251/58, 251/61, 61.4, 61.5, 63.4, 63.5, 63.6, 144, 228, 298, 339, 215

[56] References Cited

U.S. PATENT DOCUMENTS

| | | | |
|---|---|---|---|
| 1,147,292 | 7/1915 | Benson et al. | 251/228 |
| 2,285,324 | 6/1942 | Bennett | 251/228 |
| 2,301,409 | 11/1942 | Iversen | 251/63.4 |
| 2,496,898 | 2/1950 | Thompson et al. | 137/527.4 |
| 2,524,474 | 10/1950 | Randel | 251/215 |
| 2,589,346 | 3/1952 | DeFrees | 251/144 |
| 2,612,338 | 9/1952 | Flosdorf et al. | 251/215 |
| 2,655,942 | 10/1953 | Dougherty | 251/215 |
| 2,882,008 | 4/1959 | Giauque | 251/61.4 |
| 3,098,502 | 7/1963 | Devé | 137/514 |
| 3,177,894 | 4/1965 | Camp | 137/527 |
| 3,257,093 | 6/1966 | DeFrees | 251/144 |
| 3,724,809 | 4/1973 | Reale | 251/58 |
| 3,727,880 | 4/1973 | Stock | 251/58 |
| 3,771,759 | 11/1973 | Pauquette | 251/58 |
| 4,457,486 | 7/1984 | DeFrees | 251/144 |
| 4,634,094 | 1/1987 | Geiser | 251/229 |
| 4,770,392 | 9/1988 | Schmidt | 251/215 |

FOREIGN PATENT DOCUMENTS 856234 12/1960 United Kingdom ............ 251/228

Primary Examiner—George L. Walton
Attorney, Agent, or Firm—Ostrolenk, Faber, Gerb & Soffen

[57] ABSTRACT

A valve assembly includes a seat and a valve member. The valve member is pivotally connected to and engageable with the seat to close a flow aperture. The valve member is resiliently yieldably urged into sealing engagement with the valve seat. To open the flow aperture, a portion of the valve member adjacent the pivotal connection to the seat is initially lifted from the seat, and then the valve member is rotated relative to the pivotal connection.

9 Claims, 1 Drawing Sheet

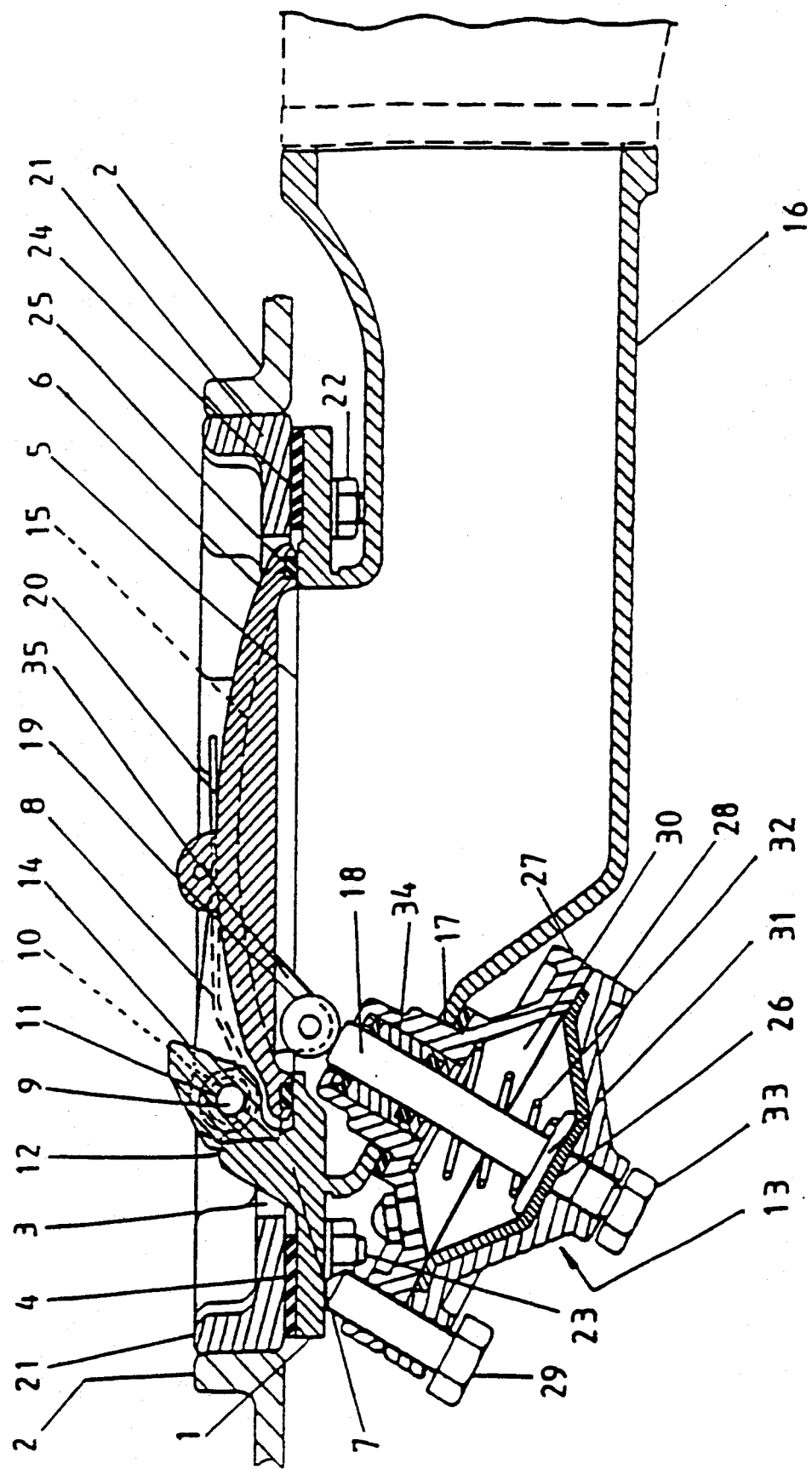

5,078,363

VALVE ASSEMBLY FOR A TANK

TECHNICAL FIELD

The invention relates to a valve assembly for a tank and, in particular, to a valve assembly for attachment to a tank to control fluid flow into or out of the tank.

BACKGROUND OF THE INVENTION

A valve assembly such as this is mounted within or adjacent a tank to avoid damage when a conduit connected to the tank is damaged by impact. Such valve assemblies are commonly used, and often required by law, on road tankers where the risk of collision damage to conduits connected to the tank is high and on storage tanks having connected conduits in exposed conditions. By arranging a valve assembly in this way, and providing self-closing means, the valve assembly and the sealing of the tank are unaffected by damage occuring outboard of the tank.

Known valve assemblies provided for this purpose often employ a poppet valve or "inverted mushroom" sealing element with the stem of the sealing element projecting into the tank and surrounded by a superstructure carrying a spring to keep the sealing element seated. Actuation has been by means of a cable pulling from within the tank or a lever mechanism pushing from outside the tank and unattached to the sealing element. One of the reasons a sealing element such as this is commonly used is that where the tank has to be filled through the valve assembly and it is necessary to minimize spray and splashing within the tank, the poppet valve or inverted mushroom head helps to reduce spray. This spray can be highly dangerous, particularly with petroleum fluids, as it helps to create static electricity charges. Suitable deflectors must therefore be provided to inhibit the formation of this spray.

This form of construction is expensive, the superstructure carrying the spring is inaccessible inside the tank, and additional clearance space is required outside the tank for assembly and disassembly of the valve assembly.

SUMMARY OF THE INVENTION

It is an object of the present invention to at least reduce some of these disadvantages of known valve assemblies for tanks.

This is achieved by providing a valve assembly comprising a seat member for sealing engagement with the tank to form a sealed region surrounding the flow aperture and having a seat facing into the tank when the seat member sealingly engages a tank formed with a flow aperture; a valve member engageable with the seat to close the flow aperture, pivot means connecting the valve member to the seat member for movement of the valve member internally of and out of engagement with the seat; resiliently yieldable first actuating means, for urging the valve member into sealing engagement with the valve seat; and a second actuating means which is arranged to be actuated to initially lift a portion of the valve member adjacent the pivot means from the seat and then to rotate the valve member relative to the pivot means.

A valve member such as this is generally mounted internally of the space bounded by the tank and the seat member and therefore is more protected than a valve member in a valve assembly disposed externally of the tank, e.g. in a conduit connected to the tank.

Where the tank has to be filled through the valve assembly, the valve member may be provided with a concave external surface facing out of the tank when the valve member engages the valve seat and the seat member sealingly engages the tank and stop means may be provided for limiting movement of the valve member out of engagement with the valve seat. In this case, the valve member deflects liquid flowing into the tank laterally of the axis of the aperture, thus reducing the formation of spray and its attendant risks.

In a preferred embodiment of the invention, the pivot means comprise first and second hinge members respectively extending from the seat member and the valve member, first and second pivot pin apertures respectively formed in the first and second hinge members, and a pivot pin extending through the first and second pivot pin apertures. However, whereas the or each first pivot pin aperture or the or each second pivot pin aperture is circular in cross-section, the or each other pivot pin aperture has a laterally elongate cross-section which extends along an axis which intersects a plane perpendicular to the axis of the flow aperture and is parallel to a plane perpendicular to the pivot pin. This allows the valve member to move away from the valve seat; preferably in a direction parallel to the axis of the flow aperture, as it rotates into its open position as a result of actuation by the second actuating means. This bodily movement of the valve member, which takes place before or simultaneously with rotational movement of the valve member allows the valve member to move off the valve seat with a minimum of rubbing and wearing movement. It is important to note that this bodily movement need not be parallel to the axis of the flow aperture. All that is necessary is that this bodily movement has a component perpendicular to the valve seat.

The second actuating means may comprise a driving member which is directly engageable with the valve member or an abutment member carried by the valve member and operable to push the valve member so that it moves out of engagement with the valve seat. In this case, the first actuating means preferably act on the valve member at a region spaced from the pivot means and the driving member acts on the valve member along an axis which passes between the pivot means and said region. This results in a force couple acting in a direction opposite to the direction of opening movement of the valve member about the pivot means. The initial movement of the valve member is a pivotal movement, in the same direction as the force couple, about engaging surfaces on the valve seat and a portion of the valve member remote from the pivot means. The portion of the valve member adjacent the pivot means is therefore first lifted from the valve seat, to the extent permitted by movement of the pivot pin in the or each pivot pin aperture of laterally elongate cross-section. Thereafter, rotational movement of the valve member takes place in the opposite direction about the pivot pin. This greatly reduces wear which would otherwise result from rubbing movement between the valve seat and the portion of the valve member adjacent the pivot means.

Where a conduit extends from the seat member on the opposite side of the seat member to the seat, a mounting aperture may be formed in this conduit and the actuating means may be mounted on the conduit so that a part of the actuating means including the driving member extends through the mounting aperture for engagement with the valve member. In alternative forms of construction, the valve member may be actuated by a pull rod or cable extending within the tank, but access to such actuating means is restricted.

Where a part of the actuating means extends through a mounting aperture formed in a conduit extending from the seat member, this part of the actuating means may extend along an axis which is inclined to the axis of the flow aperture. This reduces the lateral space occupied by the valve assembly and, when the flow opening is at the bottom of the tank with the axis of the flow aperture vertical, the actuating means occupy less vertical space, thus providing for more compact construction.

BRIEF DESCRIPTION OF THE DRAWING

An embodiment of the invention is hereinafter described, by way of example only, with reference to the accompanying drawing which is a sectional elevation of a valve assembly for a tank mounted on a portion of the tank.

DETAILED DESCRIPTION OF THE PREFERRED EMBODIMENTS

The valve assembly includes a seat member 1 which is attached to a rim member 21 forming part of a tank 2 and defining a flow aperture 3 for the flow of liquid into and out of the tank. The seat member 1 is attached to the tank by means of nuts 22 engaging screw threaded studs 23 extending from the rim member 21. A sealing gasket 24 between seat member 1 and the rim member 21 ensures that the seat member 1 engages the tank in such a way as to provide a sealed region 4 surrounding the flow aperture 3.

The seat member 1 is formed with an annular seat 5 which is engaged by a sealing ring 25 carried by a valve flap 6 which is pivotally mounted on the seat member 1 by pivot means 7 to 11 comprising a first hinge member 7 projecting from the seat member 1 and two second hinge members 8 projecting from the valve flap 6. The first hinge member 7 is provided with first pivot pin aperture 9 of circular cross-section and the two second hinge members 8 are formed with pivot pin apertures 10 which have a laterally elongate cross-section which extends along an axis parallel to the axis of the flow aperture 3. A pivot pin 11 extends through the first and second pivot pin apertures 9 and 10 so that the valve flap 6 can be rotated relative to the seat member 1 and moved perpendicular to the seat 5, to minimize wear in the sealing ring 25 and in the seat 5 as a result of frictional rubbing movement between the seat member 1 and the valve flap 6.

A spring 12, serving as resiliently yieldable first actuating means, is coiled around the pivot pin 11 and engages the first hinge member 7 so that free ends of the spring 12 engage the valve flap 6 at a region 20 spaced from the pivot means 7 to 11 and are stressed so as to urge the valve flap 6 resiliently into engagement with the seat 5 of the seat member 1.

A conduit 16 extends from the seat member 1, for guiding liquid into and out of the tank 2 and second actuating means 13, for opening the valve flap 6 are mounted on the conduit 16 so that part of the second actuating means 13 extends through a mounting aperture 17 formed in the conduit 16.

The second actuating means 13 comprise a pneumatically operated diaphragm mechanism in which a flexible diaphragm 26 is gripped at its edges between inner and outer casing members 27 and 28 which are held together by screws 29 (only one of which is shown). A driving member 18 extends through a diaphragm chamber 30 enclosed by the casing members 27 and 28 and is provided with a head 31 engaged, on one side, by the diaphragm 26 and, on the other side, by a compression spring 32.

When pressurized air is fed through a coupling 33 fitted to the outer casing member 28, the diaphragm 26 deflects and causes the member 18 to move through guide means 34 mounted in the inner casing member 27.

The member 18 abuts a roller 19 supported on a bracket 35 on the outside of the valve flap 6 and, on movement of the member 18, acts along an axis which passes between the pivot means 7 to 11 and the spaced region 20, where the ends of the spring 12 action the valve flap 6. The spring 12 and the driving member 18 therefore provide a clockwise acting force couple, in the arrangement shown in the drawing, which lifts the valve flap 6 against the force of the spring 12, causing the valve flap 6 to rotate initially in a clockwise direction about engaging surfaces on the valve seat 1 and a portion of the valve flap 6 remote from the pivot means 7 to 11 to raise a portion of the valve flap 6 adjacent the pivot means 7 to 11, causing movement of the pivot pin 11 in the laterally elongate cross-sections of the second pivot pin apertures 10 formed in the second hinge members 8 of the valve flap 6. Further movement of the member 18 causes the valve flap 6 to rotate in an anticlockwise direction about the pivot pin 11.

The first hinge member 7 of the seat member 1 is provided with stop surfaces 14 for engagement with the valve flap 6 to limit this anticlockwise opening movement of the valve flap 6. In addition, the external surface 15 of the valve flap 6 is concave so that, when liquid is fed through the conduit 16 into the tank 2, the concave external surface 15 deflects this liquid laterally of the axis of the flow aperture 3 to thereby minimize the formation of spray within the tank 2.

What I claim is:

1. A valve assembly comprising a seat member for sealing engagement with a tank formed with a flow aperture, to form a sealed region surrounding the flow aperture, and having a valve seat facing internally of the tank when the seat member sealingly engages the tank; a valve member engageable with the seat to close the flow aperture; pivot means connecting the valve member to the seat member for movement of the valve member (a) into engagement with the seat to close the aperture, and (b) into the tank to open the aperture, the pivot means connecting the valve member to the seat member in such a way as to permit a portion of the valve member adjacent to the seat and the pivot means to be lifted from the seat and to then be rotated relative to the pivot means; resiliently yieldable first actuating means for urging the valve member into sealing engagement with the valve seat; and a second actuating means which (a) is external to the tank when the flow aperture is closed, and (b) is arranged to be actuated to initially lift a portion of the valve member adjacent the pivot means from the seat and then to rotate the valve member relative to the pivot means.

2. A valve assembly according to claim 1, in which the valve member has a concave external surface facing out of the tank when the valve member engages the valve seat and the seat member sealingly engages the tank and stop means are provided for limiting movement of the valve member out of engagement with the valve seat, so that, when the valve member engages the stop means, the concave external surface is effective to deflect liquid flowing into the tank laterally of the axis of the aperture.

3. A valve assembly according to claim 1 in which the pivot means comprises first and second hinge members respectively extending from the seat member and the valve member, first and second pivot pin apertures respectively formed in said first and second hinge members, and a pivot pin extending through said first and second pivot pin apertures, wherein the or each first pivot pin aperture is circular in cross-section and the or each second pivot pin aperture has a laterally elongate cross-section which extends along an axis which intersects a plane perpendicular to the axis of the flow aperture and is parallel to a plane perpendicular to the pivot pin or the or each first pivot pin aperture has a laterally elongate cross-section which extends along an axis which intersects a plane perpendicular to the axis of the flow aperture and is parallel to a plane perpendicular to the pivot pin and the or each second pivot pin aperture is circular.

4. A valve assembly according to claim 3, in which the second actuating means comprises a driving member which is directly engageable with an abutment member carried by the valve member and operable to push the valve member so that it moves out of engagement with the seat member.

5. A valve assembly according to claim 4, in which the first actuating means acts on the valve member at a region spaced from the pivot means and the driving member acts on the valve member along an axis which passes between the pivot means and said region.

6. A fluid handling system, comprising:
a tank with a flow aperture;
a valve assembly which includes a seat member which is sealingly engaged with the tank to form a sealed region surrounding the flow aperture, and having a valve seat facing internally of the tank; a valve member engageable with the seat to close the flow aperture; pivot means connecting the valve member to the seat member for movement of the valve member (a) into engagement with the seat to close the aperture, and (b) into the tank to open the aperture, the pivot means connecting the valve member to the seat member in such a way as to permit a portion of the valve member adjacent to the seat and the pivot means to be lifted from the seat and to then be rotated relative to the pivot means; resiliently yieldable first actuating means for urging the valve member into sealing engagement with the valve seat; and a second actuating means which (a) is external to the tank when the flow aperture is closed, and (b) is arranged to be actuated to initially lift a portion of the valve member adjacent the pivot means from the seat and then to rotate the valve member relative to the pivot means; and
a conduit which extends from the seat member on the opposite side of the seat member to the seat, a mounting aperture being formed in the conduit, and the second actuating means being mounted on the conduit so that a part of the second actuating means extends through the mounting aperture for engagement with the valve member.

7. A system according to claim 6, in which said part of the second actuating means extends along an axis which is inclined to the axis of the flow aperture.

8. A system according to claim 6, in which the second actuating means comprises a driving member which is directly engageable with an abutment member carried by the valve member and operable to push the valve member so that it moves out of engagement with the seat member.

9. A system according to claim 8, in which the driving member of the second actuating means extends along an axis which is inclined to the axis of the flow aperture.

* * * * *